US010063288B2

(12) United States Patent
Fujil

(10) Patent No.: US 10,063,288 B2
(45) Date of Patent: Aug. 28, 2018

(54) COMMUNICATION DEVICE AND SIGNAL DETECTION METHOD

(71) Applicant: Samsung Electronics Co., Ltd., Gyeonggi-do (KR)

(72) Inventor: Masaaki Fujil, Kanagawa (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 14/429,330

(22) PCT Filed: Sep. 16, 2013

(86) PCT No.: PCT/KR2013/008356
§ 371 (c)(1),
(2) Date: Mar. 18, 2015

(87) PCT Pub. No.: WO2014/046435
PCT Pub. Date: Mar. 27, 2014

(65) Prior Publication Data
US 2015/0236764 A1 Aug. 20, 2015

(30) Foreign Application Priority Data
Sep. 18, 2012 (JP) ................ 2012-204911

(51) Int. Cl.
H04B 7/0413 (2017.01)
H04B 17/20 (2015.01)
(Continued)

(52) U.S. Cl.
CPC ......... H04B 7/0413 (2013.01); H04B 7/0617 (2013.01); H04B 7/086 (2013.01); H04B 17/20 (2015.01)

(58) Field of Classification Search
CPC .... H04B 17/00; H04B 7/0413; H04B 7/0617; H04B 7/08
(Continued)

(56) References Cited

U.S. PATENT DOCUMENTS 5,175,558 A * 12/1992 DuPree ........................ 342/378
2003/0161410 A1 8/2003 Smith et al.
(Continued)

FOREIGN PATENT DOCUMENTS

JP 2010-109745 5/2010

OTHER PUBLICATIONS

International Search Report dated Dec. 17, 2013 in connection with International Patent Application No. PCT/KR2013/008356, 3 pages.
(Continued)

Primary Examiner — Kevin M Burd

(57) ABSTRACT

Provided are a communication device and a signal detection method capable of improving the detection accuracy for transmission signals transmitted from one or two or more transmission devices. The communication device includes a phased-array antenna, in which a plurality of antenna elements are arranged on a plane, for receiving a signal transmitted from one or two or more transmission devices; a signal converter that includes a plurality of beamformers, each of which synthesizes a received signal received at each antenna element, for each sub-array formed by grouping the plurality of antenna elements, and converts the signal synthesized for each sub-array into a baseband signal; and a signal processor for detecting a transmission signal transmitted from each of the one or two or more transmission devices, based on a baseband signal for each sub-array, which is received from each of the plurality of beamformers, for each resource block.

20 Claims, 8 Drawing Sheets

(51) Int. Cl.
*H04B 7/08* (2006.01)
*H04B 7/06* (2006.01)

(58) Field of Classification Search
USPC .......................................... 375/224
See application file for complete search history.

(56) References Cited

U.S. PATENT DOCUMENTS

| | | |
|---|---|---|
| 2005/0001765 A1 | 1/2005 | Ryu et al. |
| 2007/0037528 A1* | 2/2007 | Doan et al. ................... 455/101 |
| 2007/0116143 A1* | 5/2007 | Bjerke et al. ................. 375/262 |
| 2008/0001765 A1* | 1/2008 | Nguyen et al. ............... 340/588 |
| 2009/0009392 A1 | 1/2009 | Jacomb-Hood et al. |
| 2010/0323732 A1* | 12/2010 | Nakaya et al. ............... 455/501 |
| 2011/0032150 A1 | 2/2011 | Park et al. |
| 2012/0033761 A1* | 2/2012 | Guo et al. .................... 375/316 |

OTHER PUBLICATIONS

Written Opinion of International Searching Authority dated Dec. 17, 2013 in connection with International Patent Application No. PCT/KR2013/008356, 5 pages.
Shoichi Sasahara, et al., Modified SC-Type Turbo Detection Using SISO-MLD for CCI Suppression in SDM-OFDM Systems, IEICE Transaction on Fundamentals, vol. E90-A, No. 9 Sep. 2007, pp. 1854-1861.
A. van Zelst, "Turbo-BLAST and Its Performance", VTC Spring, 2001, Rhodes, Greece, pp. 1282-1286.

* cited by examiner

[Fig. 1]

PRIOR ART

[Fig. 2]

PRIOR ART

[Fig. 3]

PRIOR ART

COMMUNICATION DEVICE AND SIGNAL DETECTION METHOD

CROSS-REFERENCE TO RELATED APPLICATION(S)

The present application claims priority under 35 U.S.C. § 365 to International Patent Application No. PCT/KR2013/008356 filed Sep. 16, 2013, entitled "COMMUNICATION DEVICE AND SIGNAL DETECTION METHOD", and through International Patent Application No. PCT/KR2013/008356 to Japanese Patent Application No. 2012-204911 filed Sep. 18, 2012, each of which are incorporated herein by reference into the present disclosure as if fully set forth herein.

TECHNICAL FIELD

The present invention relates to a communication device and a signal detection method.

BACKGROUND ART

In recent years, many researches and developments have been conducted to improve the transfer rate in the mobile communication system. An example of a way to improve the transfer rate in the mobile communication system may include a way to use broadband signals. In order to transmit the broadband signals, there is a need to use, for example, quasi-millimeter waves which are higher in frequency than the microwaves which have been used till now. However, the use of the high carrier frequency signals may cause an increase in propagation loss, leading to, for example, the reduction in service area (or coverage) in which mobile communication service is available, or the significant deterioration of transmission quality.

Therefore, for example, the antenna array technology that ensures the quality of the communication lines by an array gain has attracted attention as propagation loss compensation technology. In addition, technology has been developed to detect a signal transmitted by a transmitting-side communication device, from a received signal which is received via a plurality of antennas. The signal detection technology may include, for example, technology disclosed in the following Non-Patent Document 1, or technology disclosed in the following Non-Patent Document 2.

Prior Art Document

Non-Patent Document 1

S. Sasahara and T. Saba, "Modified SC-type turbo detection using SISO-MLD for CCI suppression in SDM-OFDM systems," IEICE Transaction on Fundamentals, vol. E90-A, no. 9, pp. 1854-1861, September 2007.

Non-Patent Document 2

A. V. Zelst, R. V. Nee, and G. A. Awater, "Turbo-BLAST and its performance," VTC2001-Spring, Rhodes, Greece, pp. 1282-1286, May 2001.

In order to obtain a higher array gain, there is a need for antenna elements (hereinafter may be referred to as 'array elements') which are significantly larger in number than those of the conventional phased-array antenna related to reception of the microwaves. However, for example, if a frequency converter and/or an Analog-to-Digital (A/D) converter are provided for each array element, and signal regeneration or directivity (phase) control is performed based on the received signal received by each array element, the circuit or device for processing the received signal may be large in scale.

For example, if the received signal received by each array element is synthesized by an analog circuit that processes intermediate-frequency signals, the circuit or device may be reduced in scale. In this case, however, a high-function method (for example, high-precision method) may not be used in signal regeneration or directivity control, making it impossible to sufficiently improve the transmission quality.

A method for solving these problems may include, for example, a method of grouping a plurality of array elements constituting a phased-array antenna, synthesizing the received signal received by each array element, for each sub-array formed by grouping array elements, and processing a digital signal for a signal output from each sub-array to perform signal regeneration or directivity control. If signal regeneration or directivity control is performed by synthesizing the received signal received by each array element for each sub-array as described above, the circuit or device may be set smaller in scale compared to when a frequency converter or an A/D converter is provided for each array element, and a high-function method is available.

For example, in the above method, in order to improve the precision of signal regeneration or directivity control, it is preferable to detect each of the transmission signals which are received by a phased-array antenna and transmitted from one or two or more transmission devices. Therefore, there is a need for a signal detection method (or a multi-user signal detection method suitable for an analog-digital hybrid array) capable of detecting each of transmission signals transmitted from one or two or more transmission devices.

The above information is presented as background information only to assist with an understanding of the present disclosure. No determination has been made, and no assertion is made, as to whether any of the above might be applicable as prior art with regard to the present invention.

DISCLOSURE OF INVENTION

Technical Problem

An aspect of the present invention is to address at least the above-mentioned problems and/or disadvantages and to provide at least the advantages described below. Accordingly, an aspect of the present invention is to provide new or improved communication device and signal detection method, which may improve the detection accuracy for transmission signals transmitted from one or two or more transmission devices.

Solution to Problem

In accordance with an aspect of the present invention, there is provided a communication device including: a phased-array antenna, in which a plurality of antenna elements are arranged on a plane, for receiving a signal transmitted from one or two or more transmission devices; a signal converter that includes a plurality of beamformers, each of which synthesizes a received signal received at each antenna element, for each sub-array formed by grouping the plurality of antenna elements, and converts the signal synthesized for each sub-array into a baseband signal; and a signal processor for detecting a transmission signal transmitted from each of the one or two or more transmission devices, based on a baseband signal for each sub-array, which is received from each of the plurality of beamformers, for each resource block.

This structure may improve the detection accuracy for transmission signals transmitted from one or two or more transmission devices.

In accordance with another aspect of the present invention, there is provided a method for detecting a transmission signal in a communication device including a phased-array antenna, in which a plurality of antenna elements are arranged on a plane, for receiving a signal transmitted from one or two or more transmission devices. The method includes synthesizing, by each of a plurality of beamformers, a received signal received at each antenna element, for each sub-array formed by grouping the plurality of antenna elements, and converting the signal synthesized for each sub-array into a baseband signal; and detecting a transmission signal transmitted from each of the one or two or more transmission devices, based on a baseband signal for each sub-array, which is converted in each of the plurality of beamformers for each resource block.

This method may improve the detection accuracy for transmission signals transmitted from one or two or more transmission devices.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components, and structures.

MODE FOR THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Problems in Conventional Signal Detection Technology

Prior to a description of a structure of a communication device according to an exemplary embodiment of the present invention, a description will be made of the problems in the conventional technology related to signal detection or the conventional signal detection technology (hereinafter, referred to as 'prior art' for short) in, for example, Non-Patent Document 1.

Figure 1:
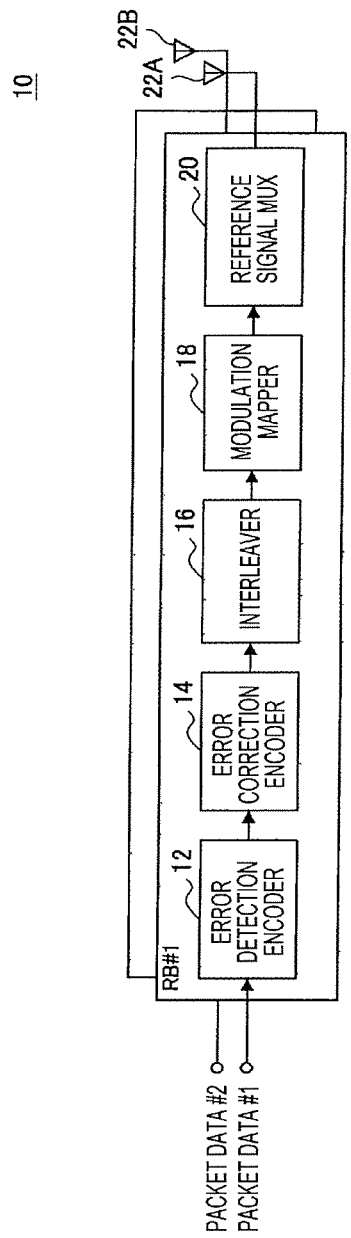
FIG. 1 illustrates an example of a communication device according to the prior art.
Figure 2:
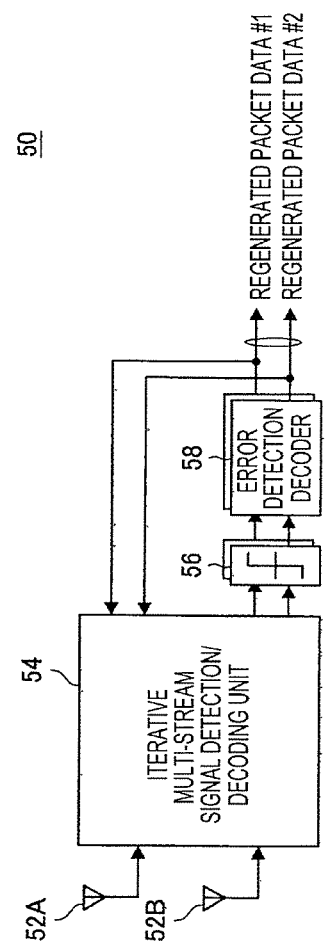
FIG. 2 illustrates an example of a communication device according to the prior art.

FIGS. 1 and 2 each illustrate an example of a communication device related to the prior art (hereinafter referred to as a 'prior art communication device'). In this example, each communication device has a Multiple Input Multiple Output (MIMO) structure in which the number of antennas is 2. FIG. 1 illustrates an example of a structure of a transmitting-side communication device (hereinafter referred to as a 'prior art transmission device') for transmitting a transmission signal, which is related to the prior art, and FIG. 2 illustrates an example of a structure of a receiving-side communication device (hereinafter referred to as a 'prior art reception device') for receiving a transmission signal, which is related to the prior art.

First, a prior art transmission device 10 will be described. The prior art transmission device 10 may include, for example, an error detection encoder 12, an error correction encoder 14, an interleaver 16, a modulation mapper 18, a reference signal multiplexer (MUX) 20, and antennas 22A and 22B. The error detection encoder 12, the error correction encoder 14, the interleaver 16, the modulation mapper 18 and the reference signal MUX 20 may process packet data to be transmitted, in units of Resource Block (RB).

The error detection encoder 12 may add a code for error detection, such as a Cyclic Redundancy Check (CRC) code, to the packet data to be transmitted.

The error correction encoder 14 may add a code for error correction, such as a Turbo code or a Low-Density Parity-check Code (LDPC) code, to the packet data received from the error detection encoder 12.

The interleaver 16 may interleave the packet data received from the error correction encoder 14, and the modulation mapper 18 may map the packet data interleaved by the interleaver 160, to modulation signal points. For example, as for an interleaving pattern in the interleaver 16, another interleaving pattern may be used in another packet.

The reference signal MUX 20 may multiplex a reference signal for performing channel estimation, to the packet data received from the modulation mapper 18. The prior art transmission device 10 may simultaneously transmit the signal corresponding to the packet data, to which the reference signal is multiplexed, via two antennas 22A and 22B. The reference signal MUX 20 may multiplex, for example, a reference signal which is orthogonal between antennas, to the packet data.

The prior art transmission device 10 may transmit the packet data to be transmitted, for example, by means of the structure illustrated in FIG. 1.

Next, a prior art reception device 50 will be described. The prior art reception device 50 may include, for example, antennas 52A and 52B, an iterative multi-stream signal detection/decoding unit 54, a decision circuit 56, and an error detection decoder 58.

The prior art reception device 50 may receive a signal transmitted from the prior art transmission device 10 via the two antennas 52A and 52B. The iterative multi-stream signal detection/decoding unit 54 may perform iterative multi-stream signal detection/error correction decoding. The decision circuit 56 may decide '0' or '1' which is a signal (for example, a digital signal), an error in which is corrected by the iterative multi-stream signal detection/decoding unit 54, and output a signal (for example, a digital signal) indicating the decision results as regenerated data (for example, received data) corresponding to the signal transmitted from the prior art transmission device 10.

The error detection decoder 58 may perform error detection by using, for example, a hard decision bit. If no bit error is detected, the error detection decoder 58 may output a decoded bit, and if a bit error is detected, the iterative multi-stream signal detection/decoding unit 54 may perform iterative processing.

Figure 3:
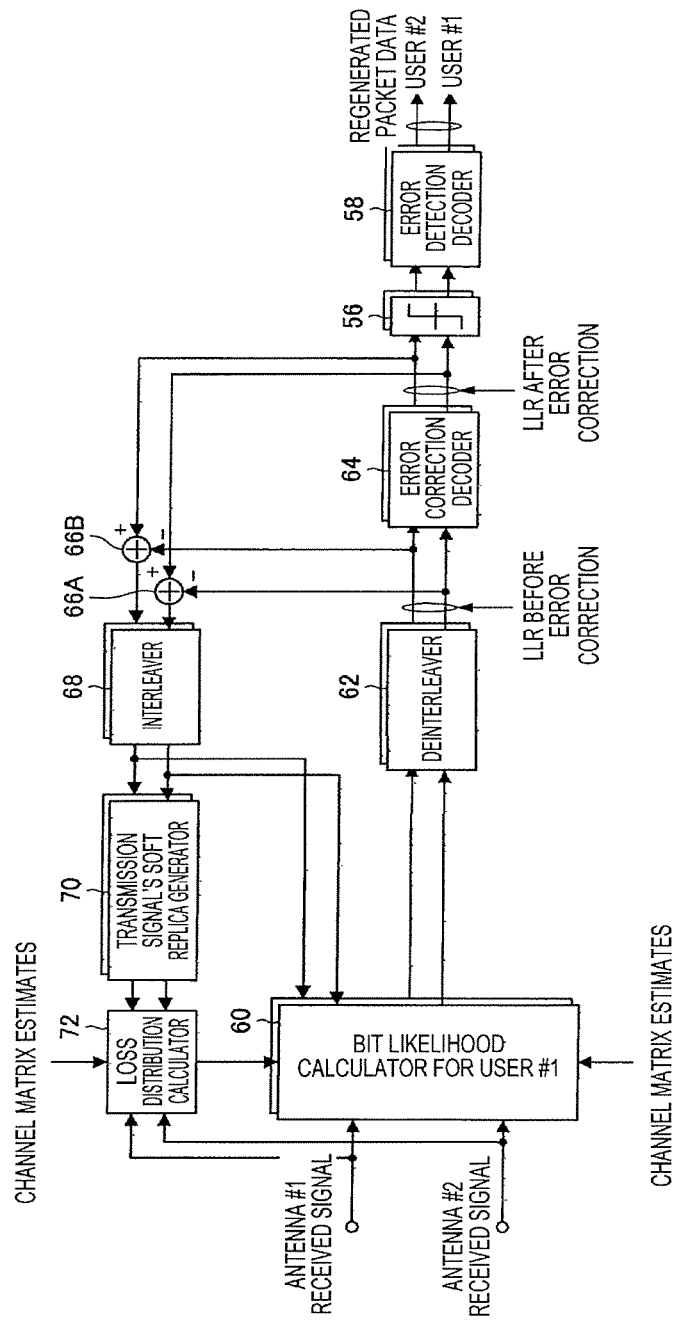
FIG. 3 illustrates an example of a structure of an iterative multi-stream signal detection/decoding unit provided in the prior art communication device illustrated in FIG. 2.

FIG. 3 illustrates an example of a structure of the iterative multi-stream signal detection/decoding unit 54 provided in the prior art communication device illustrated in FIG. 2. Specifically, FIG. 3 illustrates an example of a structure that uses Soft Input Soft Output-Maximum Likelihood Detection (SISO-MLD) related to the technology disclosed in, for example, Non-Patent Document 1. FIG. 3 also illustrates the decision circuit 56 and the error detection decoder 58, which are illustrated in FIG. 2.

The iterative multi-stream signal detection/decoding unit 54 may include, for example, a bit likelihood calculator 60, a deinterleaver 62 for reversing (or deinterleaving) the order of arrangement of an interleaved signal, an error correction decoder 64, adders 66A and 66B, an interleaver 68, a transmission signal's soft replica generator 70, and a loss distribution calculator 72.

In the iterative multi-stream signal detection/decoding unit 54, in first iteration (or first processing), the bit likelihood calculator 60 may use the basic SISO-MLD disclosed in, for example, Non-Patent Document 2, and calculate a Log-Likelihood Ratio (LLR) before error correction using noise power, for a variance value of a loss signal. The error correction decoder 64 may perform error correction using the bit value of the deinterleaved signal.

If the error remains in the first iteration (or first processing), the transmission signal's soft replica generator 70 may generate a soft replica signal of a transmission signal from the LLR after error correction, in second or later iteration. The loss distribution calculator 72 may subtract the soft replica signal from the received signal, and calculate a variance value of the residual signal. The bit likelihood calculator 60 may use the calculated variance value of the residual signal, for calculation of the LLR before error correction. In addition, during calculation of an LLR of each bit, the bit likelihood calculator 60 may give a weight of probability to other bits included in a transmission symbol of transmission signals transmitted from one or two or more transmission devices, which constitute a received signal, using the LLR after error correction decoding.

More specifically, a process in the iterative multi-stream signal detection/decoding unit 54 will be described. In first iteration (or first processing), since there is no information about transmission bits, the iterative multi-stream signal detection/decoding unit 54 may calculate an LLR before error correction, which is an index of the probability of each bit in accordance with, for example, Math Figure 1 below.

In Math Figure 1, x(k) denotes a received signal vector at time k, which is represented by, for example, Math Figure 2 below, and $\hat{H}$ denotes an estimated channel matrix of two rows and two columns. In addition, $s_i^{(c)}$ denotes an i-th transmission signal vector candidate including a bit c (0 or 1), and M denotes the number of bits corresponding to the transmission signal vector.

MathFigure 1

$$\lambda_u(i_b) = \ln \frac{\sum_{i=0}^{2^{M-1}-1} \exp\left(-\frac{|x(k) - \hat{H}s_i^{(1)}|^2}{\sigma^2}\right)}{\sum_{i=0}^{2^{M-1}-1} \exp\left(-\frac{|x(k) - \hat{H}s_i^{(0)}|^2}{\sigma^2}\right)} \quad \text{[Math. 1]}$$

MathFigure 2

$$x(k) = [x_1(k), x_2(k)]^T \quad \text{[Math. 2]}$$

For example, if a Quadrature Phase Shift Keying (QPSK) signal modulated by QPSK is used for both of a stream (or signal) #1 and a stream #2 transmitted from the prior art transmission device 10, then M=2[stream]×2[bit]=4. In this case, $s_i^{(I)}$ (for i=0, ..., 7) may be represented by, for example, Math Figure 3 below. In Math Figure, σ2 denotes a noise variance value.

MathFigure 3

$$\begin{cases} s_0^{(1)} = \left[\left(\frac{1}{\sqrt{2}}, \frac{1}{\sqrt{2}}\right), \left(\frac{-1}{\sqrt{2}}, \frac{-1}{\sqrt{2}}\right)\right] \\ s_1^{(1)} = \left[\left(\frac{1}{\sqrt{2}}, \frac{1}{\sqrt{2}}\right), \left(\frac{-1}{\sqrt{2}}, \frac{1}{\sqrt{2}}\right)\right] \\ s_2^{(1)} = \left[\left(\frac{1}{\sqrt{2}}, \frac{1}{\sqrt{2}}\right), \left(\frac{1}{\sqrt{2}}, \frac{-1}{\sqrt{2}}\right)\right] \\ s_3^{(1)} = \left[\left(\frac{1}{\sqrt{2}}, \frac{1}{\sqrt{2}}\right), \left(\frac{1}{\sqrt{2}}, \frac{1}{\sqrt{2}}\right)\right] \\ s_4^{(1)} = \left[\left(\frac{1}{\sqrt{2}}, \frac{-1}{\sqrt{2}}\right), \left(\frac{-1}{\sqrt{2}}, \frac{-1}{\sqrt{2}}\right)\right] \\ s_5^{(1)} = \left[\left(\frac{1}{\sqrt{2}}, \frac{-1}{\sqrt{2}}\right), \left(\frac{-1}{\sqrt{2}}, \frac{1}{\sqrt{2}}\right)\right] \\ s_6^{(1)} = \left[\left(\frac{1}{\sqrt{2}}, \frac{-1}{\sqrt{2}}\right), \left(\frac{1}{\sqrt{2}}, \frac{-1}{\sqrt{2}}\right)\right] \\ s_7^{(1)} = \left[\left(\frac{1}{\sqrt{2}}, \frac{-1}{\sqrt{2}}\right), \left(\frac{1}{\sqrt{2}}, \frac{1}{\sqrt{2}}\right)\right] \end{cases} \quad \text{[Math. 3]}$$

The iterative multi-stream signal detection/decoding unit 54 may perform error correction decoding using the LLR obtained by Equation (1), and as a result of the error correction decoding, if it is determined that a bit error remains, the iterative multi-stream signal detection/decoding unit 54 may perform the following process.

First, the iterative multi-stream signal detection/decoding unit 54 may obtain a soft replica of each bit based on the LLR after decoding in accordance with, for example, Math Figure 4 below.

MathFigure 4

$$c_u(i_b) = \tanh\{\hat{\lambda}_u(i_b)/2\} \quad [\text{Math.4}]$$

The iterative multi-stream signal detection/decoding unit 54 may convert the obtained soft replica of a bit into a modulated soft symbol vector
$\tilde{s}(k)$. The iterative multi-stream signal detection/decoding unit 54 may cancel (or soft-cancel) the replica of the transmission signal from the received signal vector by using again the channel estimate
$\hat{H}$, as shown in, for example, Math Figure 5 below. In Math Figure 5,
$d(k)$ denotes a residual signal vector.

MathFigure 5

$$\zeta = E[|d(k)|^2] - [E\{d(k)\}]^2 \quad [\text{Math.5}]$$

The residual signal vector
$d(k)$
may include noise components and residual signal components, and a variance value of the residual signal vector may be calculated by, for example, Math Figure 6 below.

MathFigure 6

$$\zeta = E[|d(k)|^2] - [E\{d(k)\}]^2 \quad [\text{Math.6}]$$

The iterative multi-stream signal detection/decoding unit 54 may calculate an LLR before error correction in accordance with, for example, Math Figure 7 below, by using the residual signal's variance value $\zeta$ calculated by Math Figure 6. In Math Figure 7,
$\hat{c}_u(i)_{\backslash n}$
denotes a bit vector constituting
$s_i^{(c)}$,
with an ib-th bit excluded. In addition,
$L_{\backslash i_b}$
denotes a vector that has, as its value, an LLR after decoding for each bit.

MathFigure 7

$$\lambda_u(i_b) = \ln \frac{\sum_{i=0}^{2^{M-1}-1} \exp\left(-\frac{|x(k) - \hat{H}s_i^{(1)}|^2}{\zeta}\right) \exp(\hat{c}_u(i)_{\backslash i_b} L_{\backslash i_b})}{\sum_{i=0}^{2^{M-1}-1} \exp\left(-\frac{|x(k) - \hat{H}s_i^{(0)}|^2}{\zeta}\right) \exp(\hat{c}_u(i)_{\backslash i_b} L_{\backslash i_b})} \quad [\text{Math. 7}]$$

In second or later processing, the iterative multi-stream signal detection/decoding unit 54 may perform again error correction decoding, using the newly obtained LLR shown in Math Figure 7.

If the conventional signal detection technology disclosed in, for example, Non-Patent Document 1 is used, the prior art reception device 50 may detect transmission signals transmitted from one or two or more transmission devices as the iterative multi-stream signal detection/decoding unit 54 performs, for example, the above processing.

However, if the conventional signal detection technology disclosed in, for example, Non-Patent Document 1 is used, the number of streams or the modulation level may increase, causing an increase in computation.

Also, for example, in the conventional signal detection technology, since the LLR after decoding is used only for estimation of a variance value of the residual signal, the LLR after decoding may not be sufficiently used. Therefore, for example, even though the conventional signal detection technology is used, the detection accuracy for transmission signals transmitted from one or two or more transmission devices may not be improved.

In addition, as for the received signal received at the phased-array antenna, since the received signal is correlated with the noise, it is difficult to apply, for example, the intact conventional signal detection technology to the received signal.

Communication Device According to Embodiment of Invention

Next, a communication device according to an exemplary embodiment of the present invention will be described. In the following description, the communication device is assumed to process a signal (or an Orthogonal Frequency Division Multiplexing (OFDM) signal) modulated by OFDM. In addition, the signal received and processed by the communication device is not limited to the signal modulated by OFDM.

Figure 4:
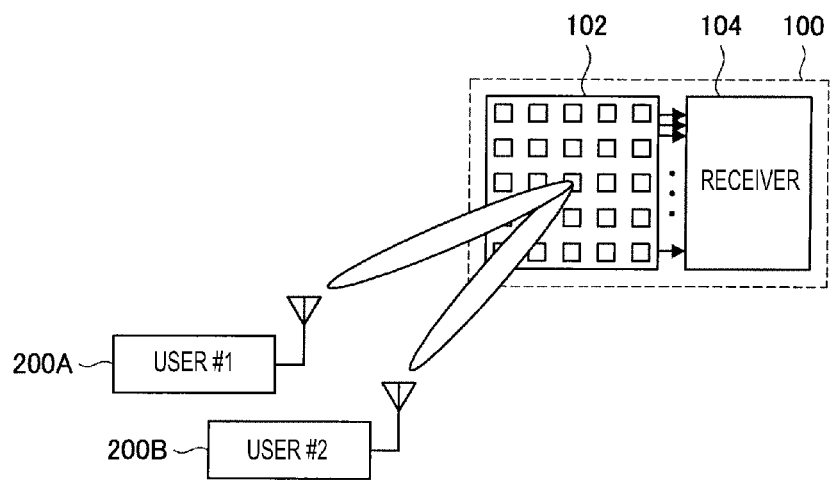
FIG. 4 illustrates an example of a communication system having a communication device according to an exemplary embodiment of the present invention.

[1] Overview of Communication System Having Communication Device According to Embodiment of Invention FIG. 4 illustrates an example of a communication system having a communication device according to an exemplary embodiment of the present invention. First, the overview of a communication device constituting the communication system according to an exemplary embodiment of the present invention and a transmission device according to an exemplary embodiment of the present invention will be described with reference to FIG. 4.

The communication system according to an exemplary embodiment of the present invention may include, for example, a communication device 100 and transmission devices 200A and 200B (hereinafter may be referred to as 'transmission devices 200'). Although it is assumed in FIG. 4 that the communication device 100 receives a signal transmitted from each of the two transmission devices 200 (for example, the transmission device 200A and the transmission device 200B), the signal received by the communication device 100 may not be limited to the signal transmitted from each of the two transmission devices 200. For example, the communication device 100 may receive a signal transmitted from each of one or three transmission devices 200, and process the received signal.

For convenience of description, the transmission device 200A may be referred to as a 'user #1', or a signal related to the signal transmitted from the transmission device 200A may also be referred to as a 'user #1'. Similarly, the transmission device 200B may be referred to as a 'user #2', or a signal related to the signal transmitted from the transmission device 200B may also be referred to as a 'user #2'.

[1-1] Overview of Communication Device According to Embodiment of Invention

The communication device 100 may include, for example, a phased-array antenna 102 and a receiver 104.

The communication device 100 may further include, for example, a controller (not shown), a Read Only Memory (ROM) (not shown), a Random Access Memory (RAM) (not shown), and other communication units (not shown) for communicating with the external devices. The communication device 100 may connect the components to one another by means of, for example, a bus which is a data transmission path.

The controller (not shown) may be comprised of, for example, a Central Processing Unit (CPU) or various processing circuits, and may control the overall operation of the communication device 100. The controller (not shown) may serve as, for example, the receiver 104. It will be apparent to those of ordinary skill in the art that the receiver 104 may be comprised of a dedicated (or universal) processing circuit.

The ROM (not shown) may memorize a program used by the controller (not shown), or control data such as operation parameters. The RAM (not shown) may temporarily memorize programs or the like executed by the controller (not shown).

The other communication units (not shown) may be other communication means provided in the communication device 100, and may communicate with the external devices over the network (or directly) wirelessly or by wires. Examples of the other communication units (not shown) may include, for example, an IEEE802.11b port and a transmitting/receiving circuit (for wireless communication); an optical connector to which an optical fiber is connected, and an optical Integrated Circuit (IC); or a Local Area Network (LAN) terminal and a transmitting/receiving circuit (for wired communication). Examples of the network according to an exemplary embodiment of the present invention may include, for example, a wired network such as a LAN or a Wide Area Network (WAN), a wireless network such as a Wireless Local Area Network (WLAN) or a Wireless Wide Area Network (WWAN), or the Internet that uses a communication protocol such as a Transmission Control Protocol/Internet Protocol (TCP/IP).

The phased-array antenna 102, in which a plurality of antenna elements are arranged on a plane, may receive a signal transmitted from one or two or more transmission devices. The phased-array antenna 102 may be configured as, for example, a two-dimensional antenna array as illustrated in FIG. 4.

The receiver 104 may process a signal received by each antenna element of the phased-array antenna 102. A specific example of the structure of the receiver 104 will be described below.

The communication device 100, which is configured as illustrated in, for example, FIG. 4, may receive a signal, which is transmitted from each of the transmission devices 200 at the same time or at different times, and regenerate the transmission signal transmitted from each of the transmission devices 200. Therefore, the communication device 100 is required to detect the transmission signal transmitted from each of the transmission devices 200, from the signal that the signal transmitted from each of the transmission devices 200 has interfered with each other.

[1-2] Overview of Transmission Device According to Embodiment of Invention

Figure 5:
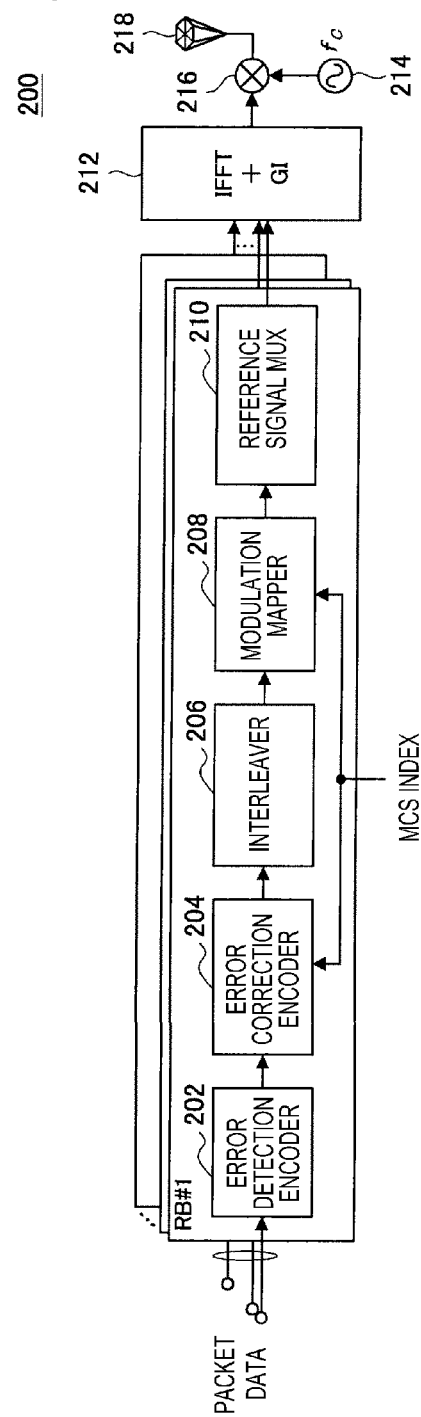
FIG. 5 illustrates an example of a structure of a transmission device according to an exemplary embodiment of the present invention.

FIG. 5 illustrates an example of a structure of a transmission device 200 according to an exemplary embodiment of the present invention. Specifically, FIG. 5 illustrates an example of a structure related to signal transmission, in the structure of the transmission device 200.

The transmission device 200 may include, for example, an error detection encoder 202, an error correction encoder 204, an interleaver 206, a modulation mapper 208, a reference signal MUX 210, an Inverse Fast Fourier Transform (IFFT) unit 212, an oscillator 214 for generating a signal of a frequency fc, a multiplier 216, and an antenna 218. The error detection encoder 202, the error correction encoder 204, the interleaver 206, the modulation mapper 208, and the reference signal MUX 210 may process packet data to be transmitted, in units of resource block.

The error detection encoder 202 may add a code for error detection, such as a CRC code, to the packet data (an example of a transmission signal) to be transmitted.

The error correction encoder 204 may add a code for error correction, such as a Turbo code or an LDPC code, to the packet data received from the error detection encoder 202.

The interleaver 206 may interleave the packet data received from the error correction encoder 204, and the modulation mapper 208 may map the packet data interleaved by the interleaver 160, to modulation signal points. A coding rate used in the error correction encoder 204 and a modulation order used in the modulation mapper 208 may be designated as a Modulation and Coding Set (MCS) index by, for example, the communication device 100 or a base station, depending on, for example, the channel condition in every resource block.

The reference signal MUX 210 may multiplex a reference signal for performing channel estimation, to the packet data received from the modulation mapper 208. The packet data (for example, a digital signal), to which the reference signal is multiplexed by the reference signal MUX 210, may correspond to, for example, a baseband signal according to an exemplary embodiment of the present invention.

Figure 6:
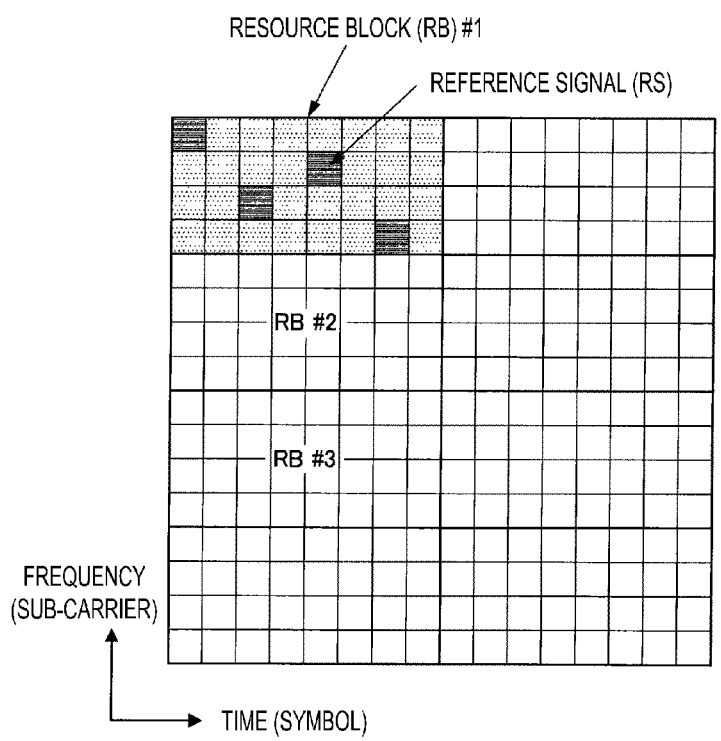
FIG. 6 illustrates an example of a baseband signal transmitted from a transmission device according to an exemplary embodiment of the present invention.

FIG. 6 illustrates an example of a baseband signal transmitted from a transmission device 200 according to an exemplary embodiment of the present invention. Specifically, FIG. 6 illustrates an example of a baseband signal in a case where the transmission device 200 transmits an OFDM signal by modulating a transmission signal by OFDM.

When modulating a transmission signal by OFDM, the transmission device 200, as illustrated in FIG. 6, may set a resource block that is comprised of OFDM symbols in the time domain and sub-carriers in the frequency domain. The modulation mapper 208 may map one codeword generated in the error correction encoder 204 to modulation signal points, and arrange them in the resource block. The reference signal MUX 210 may multiplex the reference signal as illustrated in FIG. 6. In FIG. 6, for convenience of description, the multiplexed reference signals are illustrated only in the resource block #1.

Referring back to FIG. 5, an example of the structure of the transmission device 200 will be described. The IFFT unit 212 may transform the packet data received from the reference signal MUX 210 into a time-domain signal by IFFT, and add a Guard Interval (GI) thereto. Processing in the IFFT unit 212 may correspond to processing of generating the signal transmitted from the transmission device 200.

The signal output from the IFFT unit 212 may be modulated in the multiplier 216, and transmitted towards the communication device 100 via the antenna 218. The signal transmission towards to the communication device 100 may be achieved by, for example, a sector antenna, transmission beamforming, or the like.

The transmission device 200 may transmit a signal to the communication device 100, as it has the structure illustrated in, for example, FIG. 5.

[2] Example of Structure of Communication Device According to Embodiment of Invention Next, the structure of the communication device 100 according to an exemplary embodiment of the present invention will be described in more detail. The communication device 100 will be assumed to be configured to receive signals transmitted from two transmission devices 200 (for example, the transmission device 200A and the transmission device 200B illustrated in FIG. 4).

[2-1] Structure of Communication Device According to Embodiment of Invention

Figure 7:
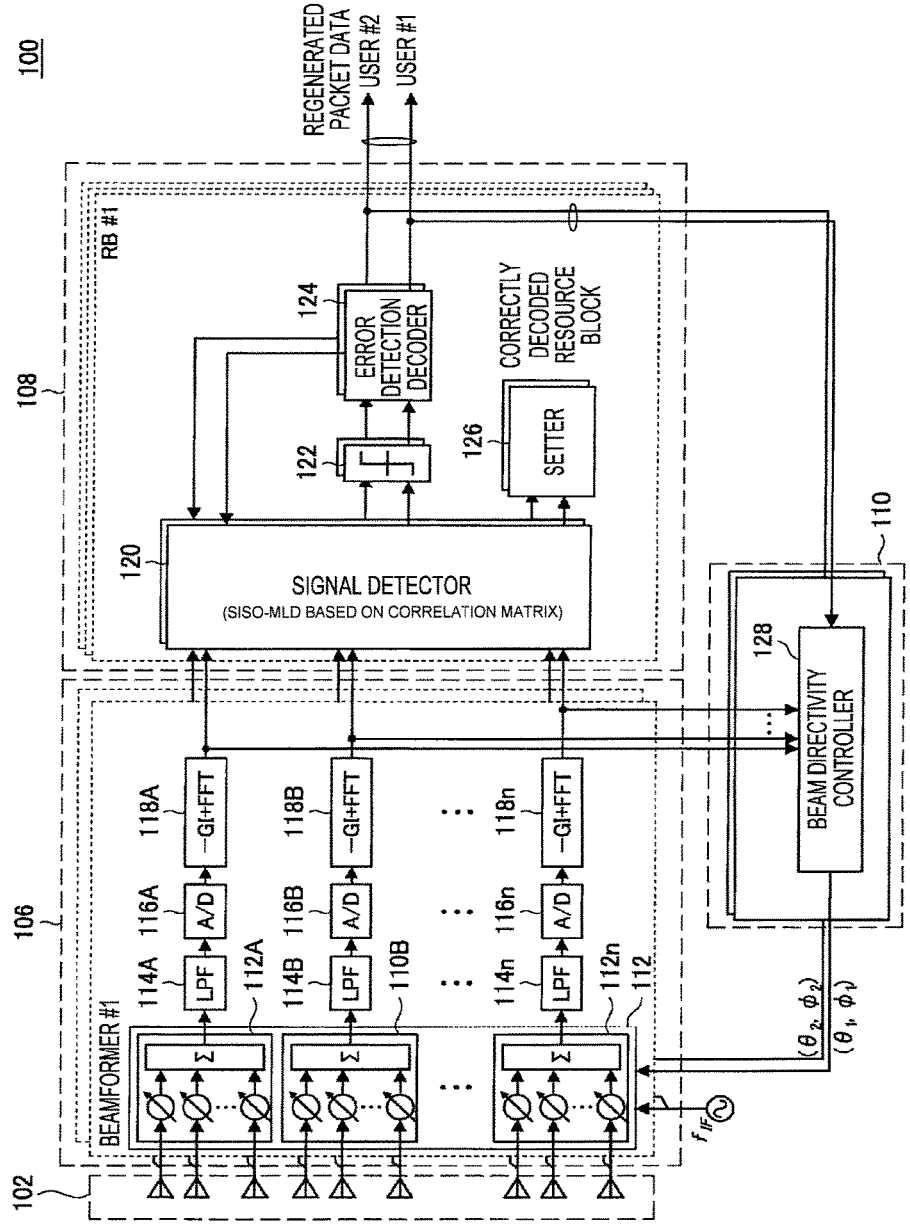
FIG. 7 illustrates an example of a structure of a communication device according to an exemplary embodiment of the present invention.

FIG. 7 illustrates an example of a structure of a communication device 100 according to an exemplary embodiment of the present invention.

The communication device 100 may include, for example, a phased-array antenna 102, a signal converter 106, a signal processor 108, and a directivity controller 110. The signal converter 106, the signal processor 108, and the directivity controller 110 may correspond to the receiver 104 illustrated in FIG. 4.

As described above, the phased-array antenna 102, in which a plurality of antenna elements are arranged on a plane, may receive a signal transmitted from one or two or more transmission devices. In the communication device 100, a plurality of antenna elements constituting the phased-array antenna 102 may be grouped into sub-arrays.

A sub-array in the communication device 100 according to an exemplary embodiment of the present invention may be comprised of four or more antenna elements of two (horizontal direction)×two (vertical direction), which may control the beam of azimuth and angle of elevation. The phased-array antenna 102 may be divided into, for example, two or more sub-arrays. In the phased-array antenna 102, the sub-arrays may be the same or different in terms of the number of their antenna elements.

The signal converter 106 may include a plurality of beamformers. Each of the beamformers provided in the signal converter 106 may synthesize a received signal received at each antenna element, for each sub-array, and convert the signal synthesized for each sub-array into a baseband signal.

The signal converter 106 may include, for example, a converter 112, Low-Pass Filters (LPFs) 114A, 114B, . . . , 114n (hereinafter may be referred to as a low-pass filter 114'), A/D converters 116A, 116B, . . . , 116n (hereinafter may be referred to as an 'A/D converter 116'), and Fast Fourier Transform (FFT) circuits 118A, 118B, . . . , 118n (hereinafter may be referred to as an 'FFT circuit 118).

The converter 112 may include, for example, conversion circuits 112A, 112B, . . . , 112n, for each sub-array. Each of the conversion circuits 112A, 112B, . . . , 112n may include a frequency converter corresponding to each of the antenna elements, and a synthesizing circuit.

A signal received at each antenna element (of each sub-array) may undergo frequency conversion in its associated frequency convert. The synthesizing circuit may synthesize the signals frequency-converted in the frequency converters. The frequency converter may convert (or shift) a frequency of the signal received at the antenna element from a radio frequency to an intermediate frequency fIF, and may further convert a frequency of the signal to a frequency corresponding to that of the transmission signal. When converting a frequency of the signal to a frequency corresponding to that of the transmission signal, the frequency converter may match a signal generated by an oscillation circuit, to the phase corresponding to the directivity desired by each antenna element. The desired directivity may be controlled by, for example, a beam directivity controller 128 constituting the directivity controller 110.

The converter 112 may convert a frequency of a received signal received at each antenna element for each sub-array by means of the structure illustrated in, for example, FIG. 7, and synthesize the frequency-converted signal.

In the converter 112, as received signals are synthesized for each sub-array after undergoing frequency conversion as described above, the signals synthesized for each sub-array may be signals that have undergone beamforming. Therefore, as illustrated in FIG. 7, the signal converter 106 may have a series of a low-pass filter 114, an A/D converter 116 and an FFT circuit 118, for each sub-array. As a result, the communication device 100 may further reduce the scale of the circuit related to processing the signals received by the phased-array antenna 102.

The signal output from each of the conversion circuits 112A, 112B, . . . , 112n may be filtered by the associated low-pass filter 114, and then sampled by the associated A/D converter 116. In other words, the low-pass filter 114 may serve as a filtering circuit, and the A/D converter 116 may serve as a sampling circuit. As the signal is sampled by the A/D converter 116, its subsequent processing in the communication device 100 may be digital signal processing.

The FFT circuit 118 may remove a guard interval GI of an OFDM signal from the sampled signal received from its associated A/D converter 116, and perform FFT thereon, thereby converting the signal into a frequency-domain signal. The signal output from the FFT circuit 118 may include, for example, a signal corresponding to the baseband signal (for example, the packet data, to which a reference signal is multiplexed in the reference signal MUX 210 of the transmission device 200 illustrated in FIG. 5) according to an embodiment of the present invention.

The signal converter 106 may include, for example, a plurality of beamformers as illustrated in FIG. 7. Each of the beamformers may synthesize a received signal received at each antenna element for each sub-array, and convert the signal synthesized for each sub-array into a baseband signal.

The structure of the signal converter 106 according to an exemplary embodiment of the present invention may not be limited to the structure illustrated in FIG. 7. Although it is assumed in FIG. 7 that the signal converter 106 includes a low-pass filter as a filtering circuit, the signal converter 106 may include another filter such as a band-pass filter, as its filtering circuit.

In addition, although it is assumed in FIG. 7 that the signal converter 106 includes two beamformers each having the converter 112, the low-pass filter 114, the A/D converter 116 and the FFT circuit 118, the signal converter 106 may include three or more beamformers. In addition, the signal converter 106 may process the signals transmitted from a plurality of transmission devices, the number of which is greater than or equal to the number of its beamformers, as it uses, for example, time division.

The signal processor 108 may detect a transmission signal transmitted from each of one or two or more transmission devices 200 based on the baseband signal for each sub-array, received from each of a plurality of beamformers, for each resource block. The signal processor 108 may, for example, decode the detected transmission signal, and obtain the decoded regenerated data (for example, data corresponding to the transmission signal).

The signal processor 108 may include, for example, a signal detector 120, a decision circuit 122, an error detection decoder (or an error detector) 124, and a setter 126.

The signal detector 120 may detect each of one or two or more transmission signals by using, for example, SISO-MLD. The signal detector 120 may correct an error in the detected transmission signal based on the code for error correction such as a Turbo code or an LDPC code, which is included in, for example, the detected transmission signal.

More specifically, for example, if an error is detected from the detected certain transmission signal in the error detection decoder 124, the signal detector 120 may generate a soft replica signal of the transmission signal based on an LLR of each bit of the detected transmission signal, and cancel interference caused by an interference signal from the baseband signal using the soft replica signal. The signal detector 120 may detect again each of one or two or more transmission signals using SISO-MLD. Specific processing in the signal detector 120 will be described below.

The decision circuit 122 may decide '0' or '1' of the signal (or the error-corrected signal) detected by the signal detector 120, and output the signal (for example, a digital signal) indicating the decision results as regenerated data (or received data) corresponding to the transmission signal transmitted from each of the transmission devices 200.

The error detection decoder 124 may detect an error in the regenerated data based on the code for error detection such as a CRC code, which is included in the regenerated data received from the decision circuit 122.

The setter 126 may set a coding rate and a modulation level of the transmission signal by calculating a Signal-to-Interference and Noise power Ratio (SINR) for each of the baseband signals. The setting 126 may calculate the SINR on the assumption that there is no interference signal components caused by, for example, the transmission signals transmitted from other transmission devices.

As the signal processor 108 includes the setter 126, the communication device 100 may realize link adaptation. Specific processing in the setter 126 will be described below.

The signal processor 108 may detect the transmission signal transmitted from each of one or two or more transmission devices 200 and perform error correction decoding thereon, by means of the structure illustrated in, for example, FIG. 7. More specific processing in the signal processor 108 will be described below.

In addition, the structure of the signal processor 108 according to an exemplary embodiment of the present invention may not be limited to the structure illustrated in FIG. 7.

For example, the signal processor 108 according to an exemplary embodiment of the present invention may be configured not to include the decision circuit 122. Even if the signal processor 108 is configured not to include the decision circuit 122, the signal processor 108 may detect the transmission signal transmitted from each of one or two or more transmission devices 200.

Alternatively, the signal processor 108 may be configured not to include, for example, the setter 126. Even though the signal processor 108 is configured not to include the setter 126, the signal processor 108 may detect the transmission signal transmitted from each of one or two or more transmission devices 200.

The directivity controller 110 may include the beam directivity controller 128, and perform directivity control for each transmission device 200. More specifically, the directivity controller 110 may control the directivity in the phased-array antenna 102 based on, for example, the baseband signal for each sub-array and the signal (for example, a signal of a correctly decoded resource block) of a resource block whose regenerated data has no error.

The communication device 100 may detect the transmission signals transmitted from one or two or more transmission devices 200 by means of the structure illustrated in, for example, FIG. 7.

The structure of the communication device 100 may not be limited to the structure illustrated in FIG. 7. For example, the communication device 100 may not include the directivity controller 110 illustrated in FIG. 7, and the directivity of the phased-array antenna 102 may be controlled by the external device having the same function as that of the directivity controller 110. Even though the communication device 100 is configured not to include the directivity controller 110, the communication device 100 may improve the detection accuracy for the transmission signals transmitted from one or two or more transmission devices 200.

[2-2] Processing Related to Signal Detection Method in Communication Device According to Embodiment of Invention Next, a description will be made of processing related to a signal detection method in a communication device according to an embodiment of the present invention. Specifically, a description will be made of processing related to a signal detection method according to an exemplary embodiment of the present invention, which is performed by, for example, the communication device 100 illustrated in FIG. 7.

The communication device 100 may synthesize a received signal received at each antenna element for each sub-array and convert the signal synthesized for each sub-array into a baseband signal (signal conversion processing), by means of, for example, each of a plurality of beamformers. In the communication device 100, the signal conversion processing may be achieved by the signal converter 106 illustrated in, for example, FIG. 7.

The communication device 100 may detect the transmission signal transmitted from each of one or two or more transmission devices based on the baseband signal for each sub-array, which is converted in each of a plurality of beamformers for each resource block (signal detection processing). In the communication device 100, the signal detection processing may be achieved by the signal processor 108 illustrated in, for example, FIG. 7.

The communication device 100 may perform, for example, (1) the signal conversion processing and (2) the signal detection processing, as the processing related to the signal detection method according to an exemplary embodiment of the present invention, thereby improving the detection accuracy for the transmission signals transmitted from one or two or more transmission devices.

The signal detection processing (2) related to the signal detection method according to an exemplary embodiment of the present invention will be described in more detail below. The signal detection processing (2) related to the signal detection method according to an exemplary embodiment of the present invention will be assumed to be performed by the communication device 100 illustrated in FIG. 7.

Figure 8:
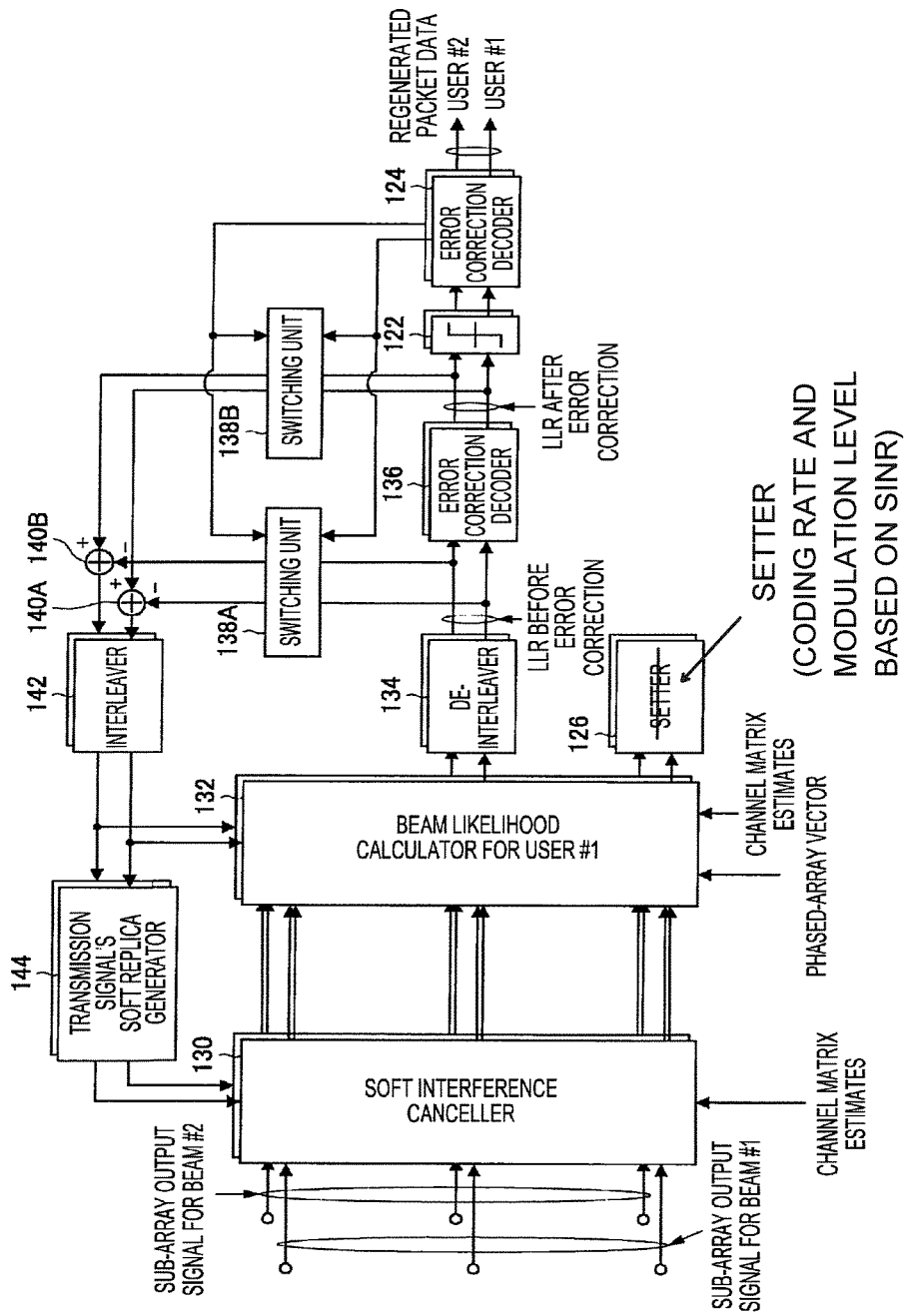
FIG. 8 illustrates signal detection processing in a communication device according to an exemplary embodiment of the present invention.

FIG. 8 illustrates signal detection processing in a communication device 100 according to an exemplary embodiment of the present invention. Specifically, FIG. 8 illustrates an example of the structure of the signal processor 108 illustrated in FIG. 7.

As described above, in the communication device 100, a controller (not shown) comprised of, for example, a CPU and the like may serve as the signal processor 108. In the communication device 100, the signal processor 108 may be implemented by, for example, a dedicated (or universal) processing circuit. In addition, each processing in the signal processor 108 may be performed by hardware, or by software (or program).

An example of signal detection processing in the communication device 100 will be described below on the assumption that the communication device 100 detects the transmission signal transmitted from each of the two transmission devices 200 (for example, the transmission device 200A and the transmission device 200B illustrated in FIG. 4). In the following description, the transmission device 200 will be referred to as a 'user', and the transmission devices 200A and 200B illustrated in FIG. 4 will be referred to as a 'user #1' and a 'user #2', respectively.

The signal processor 108 may include, for example, a soft interference canceller 130, a bit likelihood calculator 132, a deinterleaver 134 for performing deinterleaving, an error correction decoder 136, switching units 138A and 138B, adders 140A and 140B, an interleaver 142 for performing interleaving, a transmission signal's soft replica generator 144, the decision circuit 122, the error detection decoder 124, and the setter 126. For example, in FIG. 8, the soft interference canceller 130, the bit likelihood calculator 132, the deinterleaver 134, the error correction decoder 136, the switching units 138A and 138B, the adders 140A and 140B, the interleaver 142 and the transmission signal's soft replica generator 144 may constitute the signal detector 120.

The soft interference canceller 130, the bit likelihood calculator 132 and the transmission signal's soft replica generator 144 constituting the signal detector 120 may take the initiative to execute SISO-MLD in the signal detector 120.

The error correction decoder 136 may correct an error in the signal received from the deinterleaver 134 based on the code for error correction such as a Turbo code or an LDPC code, which is included in the signal (for example, the deinterleaved LLR) received from the deinterleaver 134.

The switching units 138A and 138B may selectively deliver the signal (for example, the LLR before error correction) output from the deinterleaver 134 and the signal (for example, the LLR after error correction) output from the error correction decoder 136 to the adders 140A and 140B, respectively, based on the error detection signal received from the error detection decoder 124. An example of the switching units 138A and 138B may include Field Effect Transistors (FETs), which are selectively turned on/off depending on the signal level of the error detection signal.

As the signal (for example, the LLR before error correction) output from the deinterleaver 134 and the signal (for example, the LLR after error correction) output from the error correction decoder 136 are delivered to the adders 140A and 140B, iterative processing may be achieved in the signal processor 108. For example, upon detecting an error in the detected certain transmission signal, the error detection decoder 124 may deliver, to the switching units 138A and 138B, an error detection signal (for example, an error detection signal of a signal level for turning on the switches 140A and 140B) of a signal level for performing iterative processing.

Reference will now be made to the structure of the signal processor 108 illustrated in FIG. 8 to describe the signal detection processing in the communication device 100 according to an exemplary embodiment of the present invention. It will be apparent to those of ordinary skill in the art that the structure of the signal processor 108 capable of implementing the signal detection processing in the communication device 100 may not be limited to the structure illustrated in FIG. 8. In the following description, the signal detection processing in the communication device 100 will be assumed to be performed by the signal processor 108.

If the number NBF of beamformers provided in the communication device 100 is set as NBF=2 and the number of users is set as u (=1, 2), an NEX (=NBF·NSA)-dimensional receiving array vector in a symbol k (1≤k≤K) and a sub-carrier m (1≤m≤NSA) of a sub-carrier n (1 ≤n≤NSA) may be expressed as, for example, Math Figure 8 below. The NEX-dimensional receiving array vector in Math Figure 8 may correspond to the signal, which is input to the soft interference canceller 130 and output from each sub-array.

In Math Figure 8, "gb, u(m)" denotes an NSA-dimensional channel vector for a user u in a beamformer b, and η(k, m) denotes a frequency-domain noise vector.

MathFigure 8

$$x(k, m) = G(m)s(k, m) + \eta(k, m) \qquad [\text{Math. 8}]$$
$$= \begin{bmatrix} g_{1,1}(m) & g_{1,2}(m) \\ g_{2,1}(m) & g_{2,2}(m) \end{bmatrix} \begin{bmatrix} s_1(k, m) \\ s_2(k, m) \end{bmatrix} + \eta(k, m)$$

A NEX-dimensional channel vector may be defined as, for example, Math Figure 9 below.

$$\tilde{g}_u^T = [g_{1,u}^T, g_{2,u}^T] \qquad [\text{Math.9}]$$

In first iterative processing (or first processing), there is no information about transmission bits. Therefore, the signal processor 108 may not enable the soft interference canceller 130 in first iteration (or first processing).

For example, in second or later iterative processing which is performed when an error is detected from the detected certain transmission signal in the error detection decoder 124, the signal processor 108 may enable the soft interference canceller 130, and cancel a soft replica signal of the unnecessary interference signal, as shown in, for example, Math Figure 10) below.

In Math Figure 10,
$\Delta \hat{s}_u(k, m)$ denotes a replica error signal, and may be expressed as, for example, Math Figure 11 below, and $\tilde{\eta}_u(k,m)$ denotes a newly defined loss vector including noise components and residual interference components.

MathFigure 10

$$\tilde{x}_u(k, m) = x(k, m) - \tilde{g}_{u'}(m)\hat{s}_{u'}(k, m) \qquad [\text{Math. 10}]$$
$$= \tilde{g}_u(m)s_u(k, m) + \tilde{g}_{u'}(m)\Delta \hat{s}_{u'}(k, m) + \eta_u(k, m)$$
$$= \tilde{g}_u(m)s_u(k, m) + \tilde{\eta}_u(k, m),$$

MathFigure 11

$$\Delta \hat{s}_{u'}(k, m) = s_{u'}(k, m) - \hat{s}_{u'}(k, m) \qquad [\text{Math. 11}]$$

The signal processor 108, more specifically, for example, the bit likelihood calculator 132 constituting the signal processor 108, may calculate the LLR before error correction, which is an index of the probability of each bit in the first iterative processing (or first processing) in accordance with, for example, Math Figure 12 below, like the prior art bit likelihood calculator 60 illustrated in FIG. 3. In Math FIG. 12, M denotes the number of bits corresponding to the transmission signal vector.

MathFigure 12

$$\lambda_u(i_b) = \ln \frac{\sum_{i=0}^{2^{M-1}-1} \exp\{-\zeta_{u,1}(k, m)\}}{\sum_{i=0}^{2^{M-1}-1} \exp\{-\zeta_{u,0}(k, m)\}} \qquad [\text{Math. 12}]$$

In the second or later iterative processing, the bit likelihood calculator 132 may calculate the LLR before error correction in accordance with, for example, Math FIG. 13 below. In Math Figure 13, M denotes the number of bits corresponding to the signal detected user after interference cancellation (for example, the detected transmission signal after interference cancellation).

MathFigure 13

$$\lambda_u(i_b) = \ln \frac{\sum_{i=0}^{2^{M'-1}-1} \exp\{-\zeta'_{u,1}(k,m)\}\exp\{c_{u\backslash i_b}^T(k,m)L_{u\backslash i_b}(k,m)\}}{\sum_{i=0}^{2^{M'-1}-1} \exp\{-\zeta'_{u,0}(k,m)\}\exp\{c_{u\backslash i_b}^T(k,m)L_{u\backslash i_b}(k,m)\}}$$ [Math. 13]

In Math Figure 12,
$\zeta_{u,j}(k, m)$ may be expressed as, for example, Math Figure 14 below. In Math Figure 14,
$\hat{G}(m)$ denotes an estimated channel matrix.

MathFigure 14

$$\zeta_{u,j}(k,m) = [\tilde{x}_u(k,m) - \hat{G}(m)s'_j]^H \hat{R}_{\overline{\eta},u}^{-1}[\tilde{x}_u(k,m) - \hat{G}(m)s'_j]$$ [Math.14]

In Math Figure 13,
$\zeta'_{u,j}(k,m)$ may be calculated by reducing the dimension of $\hat{G}(m)$ and
$s'_j$ depending on the number of interference cancelled users.
The estimates of a loss correlation matrix may be expressed as, for example, Math FIG. 15 below. In Math Figure 15,
$\hat{R}_{\overline{\eta}}$
denotes estimates of a noise correlation matrix, which is a correlation matrix of noise components, and
$\hat{R}_{1,u}$
denotes a residual interference correlation matrix, which is a correlation matrix of residual interference components.

MathFigure 15

$$\hat{R}_{\overline{\eta},u} = \hat{R}_{\eta} + \hat{R}_{1,u'}$$ [Math.15]

The bit likelihood calculator 132 may perform SISO-MLD using the loss correlation matrix that is based on a noise correlation matrix, as shown in, for example, Math Figure 12 to Math Figure 15.

The bit likelihood calculator 132 may use only the noise correlation matrix in first iteration (or first processing). More specifically, the bit likelihood calculator 132 may perform SISO-MLD by using, for example, the noise correlation matrix as a loss correlation matrix, in first iteration (or first processing).

In second or later iterative processing, the bit likelihood calculator 132 may use both the noise correlation matrix and the residual interference correlation matrix. More specifically, in second or later iterative processing, the bit likelihood calculator 132 may perform SISO-MLD by using, for example, a matrix determined by adding the noise correlation matrix and the residual interference correlation matrix, as a loss correlation matrix.

The bit likelihood calculator 132 may calculate the noise correlation matrix that is indicated by
$\hat{R}_{\eta}$
in, for example, Math Figure 15), by using an inner product of a sub-array weight vector among a plurality of beamformers.

More specifically, the bit likelihood calculator 132 may calculate estimates of the noise correlation matrix that is indicated by
$\hat{R}_{\eta}$
in Math Figure 15, by using a sub-array weight vector
$w_{(b)}^n$
in accordance with, for example, Math Figure 16 below.

MathFigure 16

$$\begin{cases} \hat{R}_{\eta}(n,n) = \sigma_{\eta}^2, & n = 1, \ldots, N_{EX} \\ \hat{R}_{\eta}(n,n') = \frac{w_b^{(n)}w_{b'}^{(n')H}}{|w_b^{(n)}|^2}\sigma_{\eta}^2, & n' = \mathrm{mod}(n + N_{SA}, N_{EX}) \\ \hat{R}_{\eta}(n,n') = 0, & n' = \text{others} \end{cases}$$ [Math. 16]

The bit likelihood calculator 132 may calculate the estimates of the residual interference correlation matrix that is indicated by $\hat{R}_{1,u'}$
in Math Figure 15), by a product of, for example, average power of a difference signal between a soft replica signal of the transmission signal and a modulation signal point close to the soft replica signal, and a correlation matrix of the interference signal.

More specifically, the bit likelihood calculator 132 may calculate the estimates of the residual interference correlation matrix that is indicated by
$\hat{R}_{1,u'}$
in Math Figure 15, in accordance with, for example, Math Figure 17 below. In Math Figure 17,
$\varepsilon_{u'}$
denotes residual interference signal power, and the bit likelihood calculator 132 may approximately calculate the residual interference signal power in accordance with, for example, Math Figure 18) below.

In Math Figure 18,
$\hat{s}_{u'}(k, m)$
denotes a soft replica signal of an interference signal that is generated based on the LLR after error correction, an error in which is corrected in the error correction decoder 136. The soft replica signal may be generated by the transmission signal's soft replica generator 144. Also,
$\hat{\hat{s}}_{u'}(k, m)$ denotes the modulation signal point closest to the soft replica signal of the interference signal. In addition, $N_s$ denotes the number of signal points in the resource block.

MathFigure 17

$$\hat{R}_{I,u'} = E\{[\tilde{g}_{u'}(m)\Delta\hat{s}_{u'}(k,m)][\tilde{g}_{u'}(m)\Delta\hat{s}_{u'}(k,m)]^H\}$$
$$= \varepsilon_{u'}\tilde{g}_{u'}(m)\tilde{g}_{u'}^H(m),$$ [Math. 17]

MathFigure 18

$$\hat{\varepsilon}_{u'} = \frac{1}{N_S}\sum_{(k,m)\in RB}|\hat{s}_{u'}(k,m) - \hat{\hat{s}}_{u'}(k,m)|^2$$ [Math. 18]

The signal processor 108 may detect each of one or two or more transmission signals by using, for example, SISO-MLD as described above.

The signal processor 108 may perform the same operation as that of the conventional signal detection technology in first iterative processing (or first processing), but may reduce the dimension of the channel matrix by cancelling the interference user's signals, in second or later iterative processing. Therefore, the signal processor 108 may further reduce the computation related to the detection of transmission signals, compared to when the conventional signal detection technology is used.

Upon detecting the transmission signal, the signal processor 108 may consider the impact of the noise correlation, which may occur due to the signal conversion processing (1) in the signal converter 106. The consideration of the impact of the noise correlation may contribute to the improvement of signal detection characteristics. Therefore, the signal processor 108 may improve the detection accuracy for the transmission signals transmitted from one or two or more transmission devices, when it processes the received signals received at the phased-array antenna to which the conventional signal detection technology is difficult to be applied.

In addition, upon detecting the transmission signal, the signal processor 108 may consider even the impact of the residual interference due to the soft interference cancellation. The consideration of the impact of the residual interference due to the soft interference cancellation may contribute to the improvement of signal detection characteristics. Therefore, the signal processor 108 may improve the detection accuracy for the transmission signals transmitted from one or two or more transmission devices, when it processes the received signals received at the phased-array antenna to which the conventional signal detection technology is difficult to be applied.

The signal detection processing (2) in the communication system 100 according to an exemplary embodiment of the present invention may not be limited to the foregoing description. For example, the signal processor 108 provided in the communication device 100 may realize link adaptation by including the setter 126 as described above.

To realize link adaptation, for example, a base station or an access point needs to designate a transfer rate (for example, an MCS index) for data transmission in the transmission devices 200, for each resource block. Since the available transfer rate is determined based on, for example, the channel status and the signal detection performance, there is a need to estimate an SINR after signal detection.

However, in the SISO-MLD used in the signal detection processing (2) related to the signal detection method according to an exemplary embodiment of the present invention, it is difficult to calculate the SINR after signal detection.

Therefore, the signal processor 108 may calculate the SINR on the assumption that there is no interference signal components caused by the transmission signals transmitted from other transmission devices.

More specifically, for example, the setter 126 constituting the signal processor 108 may assume that an interference canceller in the soft interference canceller 130 ideally works. Under this assumption, since all users have their received signals left, the setter 126 may substitute the SINR after signal detection, which is determined by a Minimum Mean Squared Error (MMSE) spatial filter for the case where the number of users is 1.

In this case, the weight vector may be expressed as, for example, Math Figure 19 below. The SINR after signal detection may be estimated by, for example, Math Figure 20 below.

MathFigure 19

$$z_u(m) = \hat{R}_\eta^{-1} \tilde{g}_u^*(m) \quad [\text{Math. 19}]$$

MathFigure 20

$$SINR_u(m) = \frac{|z_u^T(m)\tilde{g}_u(m)|^2}{|z_u(m)|^2 \sigma_\eta^2} \quad [\text{Math. 20}]$$

The setter 126 may estimate each sub-carrier by means of calculation defined in Math Figure 20. The setter 126 may calculate the SINR for each resource block by averaging the estimation results in a resource block as shown in, for example, Math FIG. 21 below.

MathFigure 21

$$SINR_u(i_{RB}) = \frac{1}{N_{CB}} \sum_{m \in i_{RB}} SINR_u(m) \quad [\text{Math. 21}]$$

The setter 126 may set an MCS index by using an estimated SINR obtained by, for example, Math Figure 21.

More specifically, the setter 126 may specify an MCS index corresponding to the estimated SINR by using, for example, a table in which the SINR corresponds to the MCS index. The setter 126 may set the specified MCS index.

As processing on, for example, the setting of the MCS index is achieved as the signal detection processing (2) related to the signal detection method according to an exemplary embodiment of the present invention, the communication device 100 may realize link adaptation.

[2-3]

As described above, the communication device according to an exemplary embodiment of the present invention may perform, for example, the signal conversion processing (1) and the signal detection processing (2), as processing related to the signal detection method according to an exemplary embodiment of the present invention, and detect each of one or two or more transmission signals by using SISO-MLD.

The communication device may perform the same operation as that of the conventional signal detection technology in first iterative processing (or first processing), but may reduce the dimension of the channel matrix by cancelling the interference user's signals, in second or later iterative processing. Therefore, the communication device may further reduce the computation related to the detection of transmission signals, compared to when the conventional signal detection technology is used.

Upon detecting the transmission signal, the communication device may consider the impact of the noise correlation, which may occur due to the signal conversion processing (1). The consideration of the impact of the noise correlation may contribute to the improvement of signal detection characteristics. Therefore, the communication device may improve the detection accuracy for the transmission signals transmitted from one or two or more transmission devices, when it processes the received signals received at the phased-array antenna to which the conventional signal detection technology is difficult to be applied.

In addition, upon detecting the transmission signal, the communication device may consider even the impact of the residual interference due to the soft interference cancellation. Similarly, the consideration of the impact of the residual interference due to the soft interference cancellation may contribute to the improvement of signal detection characteristics. Therefore, the communication device may improve the detection accuracy for the transmission signals transmitted from one or two or more transmission devices, when it processes the received signals received at the phased-array antenna to which the conventional signal detection technology is difficult to be applied.

As a result, the communication device may seek to improve the detection accuracy for the transmission signals transmitted from one or two or more transmission devices.

The processing related to the signal detection method according to an exemplary embodiment of the present invention may have, for example, the following advantages (I)~(IV), compared to the conventional signal detection technology disclosed in, for example, Non-Patent Document 1. The communication device that uses the signal detection method according to an embodiment of the present invention because of these advantages, may achieve the effects that the conventional signal detection technology may not obtain.

In addition, the processing related to the signal detection method according to an exemplary embodiment of the present invention may have, for example, the following effect (V), compared to the conventional link adaptation technology.

(I)

In the conventional signal detection technology disclosed in, for example, Non-Patent Document 1, a signal, which is received on one of multiple beams associated with multiple users, is used. On the contrary, the communication device using the signal detection method according to an exemplary embodiment of the present invention may perform multi-user signal detection by using all sub-array output signals on all multiple beams, when detecting a user signal for each of multiple users.

(II)

In the conventional signal detection technology disclosed in, for example, Non-Patent Document 1, signal detection is performed on all of multiple streams in all iterations of iterative SISO-MLD. On the contrary, the communication device using the signal detection method according to an exemplary embodiment of the present invention may perform signal detection for all of multiple users in first iteration, but in second or later iteration, may perform soft interference cancellation on the signals from users other than the target user for signal detection when detecting each of user signals, and perform iterative SISO-MLD, with the number of users reduced for the residual signals.

(III)

In the conventional signal detection technology disclosed in, for example, Non-Patent Document 1, the noises added to the signals received by diversity antennas are independent of each other. On the contrary, in the structure of the communication device using the signal detection method according to an exemplary embodiment of the present invention, weighting addition may be performed on the signals to which the same noises are added, by different array weights when multiple beams are formed, so noise correlation may occur between beams. Therefore, the communication device may perform SISO-MLD in which the impact of noise correlation is taken into consideration.

(IV)

In the conventional signal detection technology disclosed in, for example, Non-Patent Document 1, a variance value (for example, a scalar value) of a residual signal including residual interference components is easily used. On the contrary, the communication device using the signal detection method according to an exemplary embodiment of the present invention may calculate a power value of an error signal in SISO-MLD, and it may approximate a product of a variance value of the residual signal, which is calculated from the transmission signal's replica, and a correlation matrix of the interference signal.

(V)

The conventional link adaptation technology is used for the signal detection technology which is simpler than SISO-MLD, and there has been no simple link adaptation technology which can be applied to such technology as SISO-MLD. On the contrary, the communication device using the signal detection method according to an exemplary embodiment of the present invention may perform link adaptation more easily, since it processes signals on the assumption that signals from users other than the target user for signal detection are cancelled.

While the present invention has been described so far with reference to a communication device by way of example, exemplary embodiments of the present invention are not limited to the forms and details described above. Exemplary embodiments of the present invention may be applied to a variety of devices such as, for example, a device serving as a base station and a device serving as a wireless access point. Also, exemplary embodiments of the present invention may be implemented as, for example, a signal processing IC that can be incorporated into the above-described device.

Program According to Embodiment of Invention

As a program (for example, a program capable of performing processing related to the signal detection method according to an exemplary embodiment of the present invention, such as the signal conversion processing (1) and the signal detection processing (2)) for allowing a computer to function as a communication device according to an exemplary embodiment of the present invention is executed on a computer equipped with a phased-array antenna, the detection accuracy for transmission signals transmitted from one or two or more transmission devices may be improved.

As is apparent from the foregoing description, the present invention makes it possible to improve the detection accuracy for transmission signals transmitted from one or two or more transmission devices.

While the invention has been shown and described with reference to certain exemplary embodiments thereof, it will be understood by those skilled in the art that various changes in form and details may be made therein without departing from the spirit and scope of the invention as defined by the appended claims and their equivalents.

For example, although a program (for example, a computer program) for allowing a computer to function as a communication device according to an exemplary embodiment of the present invention is provided in the foregoing description, exemplary embodiments of the present invention may be provided even to the recording media, in which the program is stored.

The invention claimed is:

1. A communication device comprising:
a phased-array antenna including a plurality of antenna elements arranged on a plane, wherein the phased-array antenna is configured to receive a plurality of signals related to two or more transmission signals transmitted respectively from two or more transmission devices, wherein the phased-array antenna is configured to include two or more sub-arrays, each of the two or more sub-arrays includes one or more antenna elements that are included in the plurality of antenna elements;

a signal converter comprising a plurality of beamformers, wherein each of the plurality of beamformers is configured to:
    generate two or more first signals corresponding to the two or more sub-arrays, wherein one of the two or more first signals is synthesized from one or more second signals that are received respectively from the one or more antenna elements included in one among the two or more sub-arrays, and wherein a plurality of sets of the two or more first signals corresponds to the plurality of beamformers respectively; and
    convert the plurality of sets of the two or more first signals into a plurality of sets of two or more baseband signals respectively; and
a signal processor configured to detect, based on the plurality of sets of the two or more baseband signals corresponding to the plurality of beamformers for first resource blocks corresponding to second resource blocks, the two or more transmission signals, wherein the plurality of sets of the two or more baseband signals are converted respectively in the plurality of beamformers, and wherein the first resource blocks is set by the communication device, based on the second resource blocks set by the two or more transmission devices.

2. The communication device of claim 1, wherein the signal processor comprises:
    a signal detector configured to detect the two or more transmission signals using soft input soft output-maximum likelihood detection (SISO-MLD); and
    an error detector configured to detect an error from each of the two or more transmission signals,
    wherein the signal detector is further configured to:
        upon detecting an error from one of the two or more transmission signals in the error detector, generate a soft replica signal of the one of the two or more transmission signals based on a log-likelihood ratio (LLR) of each bit of the one of the two or more transmission signals;
        cancel interference caused by an interference signal from each of the two or more baseband signals using the soft replica signal; and
        detect each of the two or more transmission signals by using again the SISO-MLD.

3. The communication device of claim 2, wherein the signal processor is configured to include a setter configured to calculate a signal-to-interference and noise power ratio (SINR) for each of the two or more baseband signals and set a coding rate and a modulation level of each of two or more transmission signals, and wherein the setter is also configured to calculate the SINR based on an assumption that there is no interference signal component caused by at least one other transmission signal transmitted from at least one other transmission device.

4. The communication device of claim 2, wherein the signal detector is configured to:
    calculate a noise correlation matrix that is a correlation matrix of noise components, using an inner product of sub-array weight vectors of the plurality of beamformers; and
    perform the SISO-MLD using a loss correlation matrix that is the calculated noise correlation matrix.

5. The communication device of claim 4, wherein the signal processor is configured to include a setter configured to calculate a signal-to-interference and noise power ratio (SINR) for each of the two or more baseband signals and set a coding rate and a modulation level of each of two or more transmission signals, and wherein the setter is also configured to calculate the SINR based on an assumption that there is no interference signal component caused by at least one other transmission signal transmitted from at least one other transmission device.

6. The communication device of claim 4, wherein the signal detector is configured to:
    perform, in a first process, the SISO-MLD using the noise correlation matrix as the loss correlation matrix; and
    perform, in a second reprocessing or a later reprocessing, the SISO-MLD using, as the loss correlation matrix, a matrix obtained by adding the noise correlation matrix to a residual interference correlation matrix that is a correlation matrix of residual interference components.

7. The communication device of claim 6, wherein the signal processor is configured to include a setter configured to calculate a signal-to-interference and noise power ratio (SINR) for each of the two or more baseband signals and set a coding rate and a modulation level of each of two or more transmission signals, and wherein the setter is also configured to calculate the SINR based on an assumption that there is no interference signal component caused by at least one other transmission signal transmitted from at least one other transmission device.

8. The communication device of claim 6, wherein the signal detector is configured to determine the residual interference correlation matrix by calculating a product of the correlation matrix of the interference signal and an average power of a difference signal between the soft replica signal and a modulation signal point close to the soft replica signal.

9. The communication device of claim 8, wherein the signal processor is configured to include a setter configured to calculate a signal-to-interference and noise power ratio (SINR) for each of the two or more baseband signals and set a coding rate and a modulation level of each of two or more transmission signals, and wherein the setter is also configured to calculate the SINR based on an assumption that there is no interference signal component caused by at least one other transmission signal transmitted from at least one other transmission device.

10. The communication device of claim 1, wherein the signal processor is configured to include a setter configured to calculate a signal-to-interference and noise power ratio (SINR) for each of the two or more baseband signals and set a coding rate and a modulation level of each of two or more transmission signals, and wherein the setter is also configured to calculate the SINR based on an assumption that there is no interference signal component caused by at least one other transmission signal transmitted from at least one other transmission device.

11. A method to detect transmission signals in a communication device including a phased-array antenna that includes a plurality of antenna elements arranged on a plane, the method comprising:
    receiving, by the phased-array antenna, a plurality of signals related to two or more transmission signals transmitted respectively from two or more transmission devices, wherein the phased-array antenna is configured to include two or more sub-arrays, each of the two or more sub-arrays includes one or more antenna elements that are included in the plurality of antenna elements,
    generating, by each of a plurality of beamformers, two or more first signals corresponding to the two or more sub-arrays, wherein one of the two or more first signals is synthesized from one or more second signals that are received at the one or more antenna elements included in one among two or more sub-arrays, and wherein a plurality of sets of the two or more first signals corresponds to the plurality of beamformers, respectively;

converting the plurality of sets of the two or more first signals into a plurality of sets of two or more baseband signals respectively; and detecting, based on the plurality of sets of the two or more baseband signals corresponding to the plurality of beamformers for first resource blocks corresponding to second resource blocks, the two or more transmission signals, wherein the plurality of sets of the two or more baseband signals are converted respectively in the plurality of beamformers, and wherein the first resource blocks is set by the communication device, based on the second resource blocks set by the two or more transmission devices.

12. The method of claim 11, further comprising:
detecting the two or more transmission signals using soft input soft output-maximum likelihood detection (SISO-MLD); and
detecting an error from each of the two or more transmission signals,
wherein upon detecting an error from one of the two or more transmission signals in an error detector:
generating a soft replica signal of the one of the two or more transmission signals based on a log-likelihood ratio (LLR) of each bit of the one of the two or more transmission signals;
canceling interference caused by an interference signal from each of the two or more baseband signals using the soft replica signal; and
detecting each of the two or more transmission signals by using again the SISO-MLD.

13. The method of claim 12, further comprising:
calculating a signal-to-interference and noise power ratio (SINR) for each of the two or more baseband signals and setting a coding rate and a modulation level of a transmission signal; and
calculating the SINR based on an assumption that there is no interference signal component caused by at least one other transmission signal transmitted from at least one other transmission device.

14. The method of claim 12, further comprising:
calculating a noise correlation matrix that is a correlation matrix of noise components using an inner product of sub-array weight vectors of the plurality of beamformers; and
performing the SISO-MLD using a loss correlation matrix that is the calculated noise correlation matrix.

15. The method of claim 14, further comprising:
calculating a signal-to-interference and noise power ratio (SINR) for each of the two or more baseband signals and setting a coding rate and a modulation level of a transmission signal; and
calculating the SINR based on an assumption that there is no interference signal component caused by at least one other transmission signal transmitted from at least one other transmission device.

16. The method of claim 14, further comprising:
performing, in a first process, the SISO-MLD using the noise correlation matrix as the loss correlation matrix; and
perform, in a second reprocessing or a later reprocessing, the SISO-MLD using, as the loss correlation matrix, a matrix obtained by adding the noise correlation matrix to a residual interference correlation matrix that is a correlation matrix of residual interference components.

17. The method of claim 16, further comprising:
calculating a signal-to-interference and noise power ratio (SINR) for each of the two or more baseband signals and setting a coding rate and a modulation level of each of two or more transmission signals; and
calculating the SINR based on an assumption that there is no interference signal component caused by at least one other transmission signal transmitted from at least one other transmission device.

18. The method of claim 16, further comprising determining the residual interference correlation matrix by calculating a product of the correlation matrix of the interference signal and an average power of a difference signal between the soft replica signal and a modulation signal point close to the soft replica signal.

19. The method of claim 18, further comprising calculating a signal-to-interference and noise power ratio (SINR) for each of the two or more baseband signals and setting a coding rate and a modulation level of each of two or more transmission signals; and
calculating the SINR based on an assumption that there is no interference signal component caused by a transmission signal transmitted from at least one other transmission device.

20. The method of claim 11, further comprising:
calculating a signal-to-interference and noise power ratio (SINR) for each of the two or more baseband signals and setting a coding rate and a modulation level of each of two or more transmission signals; and
calculating the SINR based on an assumption that there is no interference signal component caused by at least one other transmission signal transmitted from at least one other transmission device.

* * * * *